United States Patent [19]

Hester, III et al.

[11] Patent Number: 5,327,180
[45] Date of Patent: Jul. 5, 1994

[54] POLARIZED LENS AND METHOD OF MAKING SAME

[75] Inventors: Walter F. Hester, III, Lahaina, Hi.; Charley Richards, Indialantic, Fla.

[73] Assignee: Hester Enterprises, Inc., Lahaina, Hi.

[21] Appl. No.: 931,843

[22] Filed: Aug. 18, 1992

[51] Int. Cl.$^5$ ............................ G02C 7/10; G02C 7/12
[52] U.S. Cl. ...................................... 351/165; 351/45; 351/49; 351/166; 351/177
[58] Field of Search ...................... 351/165, 44, 45, 49, 351/177, 166

[56] References Cited

U.S. PATENT DOCUMENTS

| 2,168,220 | 8/1939 | Land | 359/483 |
| 2,320,375 | 6/1943 | Moulton | 351/165 |
| 2,409,356 | 10/1946 | Hutchings | 351/165 |
| 2,423,583 | 7/1947 | Cooper, Jr. | 351/165 |
| 2,675,740 | 4/1954 | Barkley | 351/165 |
| 3,050,422 | 8/1962 | Zak | 134/1 |
| 3,516,720 | 6/1970 | Mauer | 351/165 |
| 3,560,076 | 2/1971 | Ceppi | 359/483 |
| 3,617,114 | 11/1971 | Rogers | 351/49 |
| 4,045,125 | 8/1977 | Farges | 351/44 |
| 4,070,097 | 1/1978 | Gelber | 351/44 |
| 4,160,584 | 7/1979 | Giles | 351/49 |
| 4,311,368 | 1/1982 | Saito et al. | 351/165 |
| 4,452,516 | 6/1984 | Salia-Munoz | 351/45 |
| 4,838,673 | 6/1989 | Richards et al. | 351/44 |

FOREIGN PATENT DOCUMENTS 829738 7/1938 France .
1114996 4/1956 France .

OTHER PUBLICATIONS

*Nikon GX Polarized Lens*, NSG-01, Nikon Inc. 1992.
Patented Polarized Glass Lens, Maui Jim Sunglasses, Hester Enterprises, 1992.
Supplementary European Search report, dated Dec. 17, 1991.

*Primary Examiner*—Scott J. Sugarman
*Attorney, Agent, or Firm*—Bell, Seltzer, Park & Gibson

[57] ABSTRACT

A lens and a pair of glasses incorporating the lens wherein each lens has first and second lens elements, preferably formed of mineral glass, with a bigradient coating deposited on the inner surface of the first lens element by a vacuum coating process. The lens elements are laminated together with a polarization film therebetween and have an anti-reflectant coating preferably on the outer surface of the second lens element. Waterproof coatings may be formed on the anti-reflectant coated outer surface of the second lens element and the outer surface of the first lens element.

30 Claims, 1 Drawing Sheet

POLARIZED LENS AND METHOD OF MAKING SAME

FIELD OF THE INVENTION

This invention relates to lenses and more particularly to lenses incorporating polarizing films, bigradient coatings, and anti-reflectant coatings.

BACKGROUND OF THE INVENTION

Sunlight is typically regarded as unpolarized light. In order to reduce the glare on reflected light, glass lenses, and in particular sunglass lenses, have incorporated polarizing elements. The lens is typically polarized by introducing a polarization film to each sunglass lens element to produce double refraction wherein the impinging light is divided into two orthagonal beams by the polarizing lens elements.

Bigradient and single-gradient coatings have also been applied to sunglass lens elements in order to produce a mirrored appearance for the sunglass lenses and to decrease transmission of visible light in order to reduce the associated glare. See for example, Hutchings U.S. Pat. No. 2,409,356 and Barkely U.S. Pat. No. 2,675,740 which describe a coating for lens elements applied as a film on upper and lower portions of the lens elements by a high vacuum thermal evaporation process. Bigradient coatings have typically not been utilized, however, in combination with polarization films because the polarization films are destroyed by the heat required to apply the bigradient coating.

A sunglass lens element incorporating both a polarization film, a bigradient coating, and anti-reflectant coating is described in Richards et al. U.S. Pat. No. 4,838,673, entitled *Polarized Lens and Method of Making the Same*. The sunglass lens element of the Richards, et al., patent comprises a pair of ground mineral glass mounds laminated together with polarization film to form a single lens element. The outer surface of the first glass mound is thereinafter coated with a bigradient coating while the outer surface of the second glass mound is coated with an anti-reflectant coating.

The Richards, et al. patent also discloses a method for manufacturing such sunglass lens elements which includes the steps of positioning the laminated lens element on an inner dome of a vacuum vaporization dome. The lens elements, preferably at least one pair of right and left lenses, are aligned on the inner dome according to reference lines existing thereon, and bigradient materials are vaporized within the vacuum vaporization dome such that they adhere to the outer or convex surface of the lens element. A cooling means is also required for maintaining the inner dome at a temperature less than or equal to 50° C. such that the polarization film is not destroyed. The vaporizing material is also blocked along the horizontal axis of the lens element, so as to establish a separate bigradient coating on the upper and lower surfaces of the lens element.

In conclusion, although sunglass lenses incorporating polarization films, a bigradient coating, and an anti-reflectant coating are highly desirable, the art has not heretofore suggested a viable sunglass lens incorporating a polarization film, a bigradient coating, and an anti-reflectant coating.

SUMMARY OF THE INVENTION

It is therefore an object of the invention to provide an improved lens.

It is another object of the invention to provide an improved lens incorporating both a polarization film and a bigradient coating.

It is yet another object of the invention to provide an improved method of making a lens.

These and other objects are provided, according to the invention, by a lens, such as a sunglass lens, including a pair of individual lens elements, preferably comprised of mineral glass which has been ground and polished. The sunglass lens also includes a bigradient coating, preferably comprised of silicon dioxide or metal oxide chrome on the inner surface of the first lens element. The bigradient-coated inner surface of the first lens element and the outer surface of the second lens element are laminated together with a polarization film disposed between the two lens elements. The polarization film is preferably comprised of iodine and polyvinyl alcohol.

The sunglass lens also preferably includes an anti-reflectant coating, preferably comprised of magnesium hexafluoride, on the outer surface of the second lens element. The sunglass lens also preferably includes a hydroponic coating, preferably comprised of silicon dioxide, on either the anti-reflectant coated outer surface of the second lens element or the outer surface of the first lens element, or more preferably on both the anti-reflectant coated outer surface of the second lens element and the outer surface of the first lens element. A pair of lenses may be incorporated in a frame to form a pair of glasses, such as sunglasses.

The lenses of the present invention having an internal bigradient coating do not present the highly mirrored appearance of lenses having an external bigradient coating. The internal bigradient coating and reduced mirror effect also decrease the amount of impinging light reflected to the wearer's skin, particularly the wearer's nose, which may otherwise cause sunburning. An internal bigradient coating is also protected from scratching or abrasion in contrast to external bigradient coatings. The internal bigradient coating also increases the horizontal clarity stripe in the middle of lens by thirty percent (30%) which results in better visual acuity.

The lens of the present invention is preferably manufactured by initially grinding and polishing the first and second lens elements. The first and second lens elements are thereinafter cleaned, preferably by an ultrasonic cleaning process.

The inner surface of the cleaned first lens element has a bigradient coating deposited thereon. The bigradient coating is preferably deposited by placing at least one first lens element on an aligning means, preferably an inner dome of a vacuum coating machine. Preferably, a pair of lens elements, i.e., right and left lens elements, are simultaneously processed to insure equal deposition of the bigradient coating. A bigradient coating material is subsequently vaporized beneath the aligning means such that the inner surface of the first lens element which faces the vaporizing means is coated with the vaporized bigradient coating material. The vaporized bigradient coating material is blocked along the horizontal axis of the first lens element such that distinct upper and lower sections of bigradient coating are formed upon the lens element with a clarity stripe having substantially no bigradient coating formed thereon positioned therebetween. The aligning means and the vaporizing means are preferably housed in a vacuum vaporization dome, preferably having a pressure of less than $6 \times 10^{-3}$ PA to facilitate proper vaporization and deposition of the bigradient coating material.

The process for manufacturing lenses of the present invention allows for deposition of the bigradient coating before the introduction of the polarization film. By first depositing the bigradient coating, the heat associated with the deposition process does not need to be cooled or dissipated in order to protect the polarization film which may be damaged by such heat. The manufacturing process may, thus, be simplified in comparison to processes requiring cooling of the lens element during the bigradient coating deposition to protect a polarization film.

The bigradient coated inner surface of the first lens element is subsequently laminated to an inner surface of a second lens element with the polarization film. Preferably, the laminated lens elements are thereinafter cut to a desired shape and anti-reflectant coating is applied to the outer surface of the second lens element. Waterproof coatings may be applied to at least one of the outer surfaces of the precut lens element if desired.

DESCRIPTION OF THE PREFERRED EMBODIMENT

Figure 1:
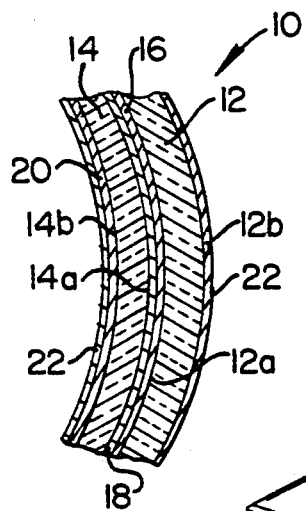
FIG. 1 is a cross-sectional side view of a sunglass lens element according to the present invention.

The present invention now will be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this disclosure will be thorough and complete, and will fully convey the scope of the invention to those skilled in the art. In the drawings, the thickness of the lens elements as well as the coatings and films deposited thereon are exaggerated for clarity. Like numbers refer to like elements throughout. Moreover, the order of applying the various coatings before cutting the lens element should not be construed as a limitation, as the scope of the invention is intended to cover any combination of coatings before or after the lens element is cut into its desired shape.

Figure 2:
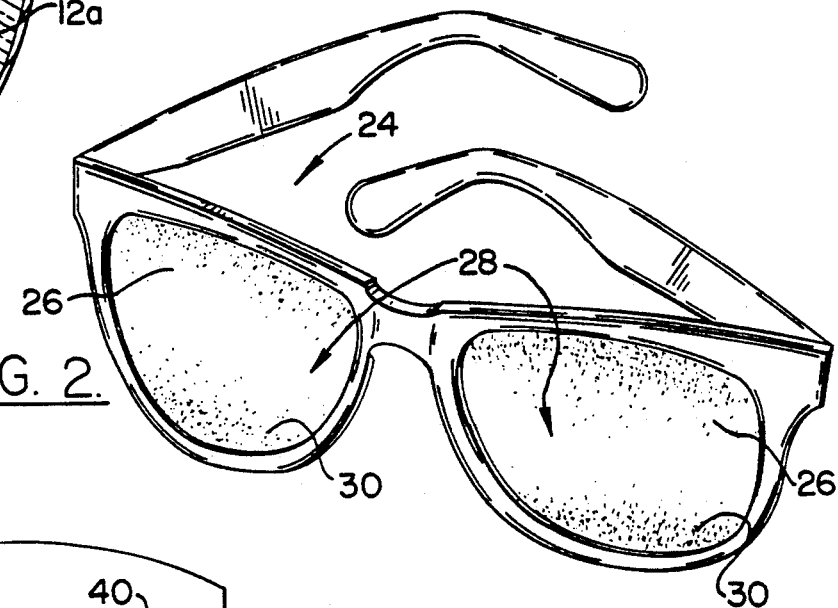
FIG. 2 is a perspective view of a pair of sunglasses employing two lens elements according to the present invention.

Referring now to FIGS. 1 and 2, a sunglass lens element according to the present invention is illustrated. The sunglass lens element 10 includes a first lens element 12 and a second lens element 14 with both the first and second lens elements preferably comprised of mineral glass which is ground and polished on both sides to form a six-base curve. A bigradient coating 16 is applied to the inner (here concave) surface 12a of the first lens element 12. The bigradient-coated inner surface of the first lens element 12 and the inner (here convex) surface of the second lens element 14 are laminated together with a polarization film 18 disposed therebetween. The polarization film is preferably comprised of long, slender molecules of iodine atoms and polyvinyl alcohol arranged along parallel and perpendicular lines. Preferably, an anti-reflectant coating 20, typically comprised of magnesium hexafluoride, is vacuum deposited on outer (here concave) surface 14b of the second lens element 14 to absorb bounce back light to prevent exposure of the eyes to ultraviolet light. Additionally, a waterproofing coating 22, preferably comprised of silicon dioxide, is preferably applied to both the anti-reflectant coated outer surface of the second lens element 14 and the outer (here convex) surface 12b of the first lens element 12 to further protect the resulting sunglass lens from water damage and to allow simple removal of smudges.

As shown more clearly in FIG. 2, a pair of glasses 24 incorporating a pair of lens elements, according to the present invention, have an upper bigradient-coated area 26, a horizontal region defining a clarity stripe 28 having substantially no bigradient coating and a lower bigradient-coated area 30. The increased width of the clarity stripe 28 allows for increased visual acuity in the center portion of the lens. Region 28 indicating the approximate position of the clarity stripe is for illustrative purposes only and forms no visible element or structural component of the lens element.

While lens elements 12, 14 of the present invention may be comprised of any suitable material, the lens elements are preferably manufactured by initially grinding and polishing mineral glass on both sides thereof to form first and second lens elements. The lens elements are subsequently passed through a cleaning process, preferably an ultrasonic wave cleaning process utilizing an ultrasonic wave cleaning machine to remove dirt from the lens elements.

Preferably, the cleaning process sequentially passes the lens elements through eight different tubs. Tubs 1 and 2 contain a synthetic cleaning fluid, preferably Alconox ™, which is maintained at approximately 50° C. Tub 3 contains regular or tap water maintained at approximately 19° C. Tub 4 contains distilled water at approximately 19° C. Tub 5 contains isopropyl alcohol which is maintained at approximately 15° C. Tubs 6 and 7 contain isopropyl alcohol and are also maintained at 15° C. Lastly, Tub 8 contains flon.

Figure 3:
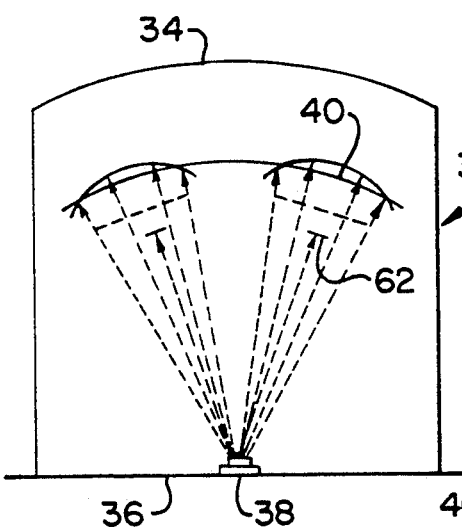
FIG. 3 is a schematic representation of the lens coating apparatus.
Figure 4:
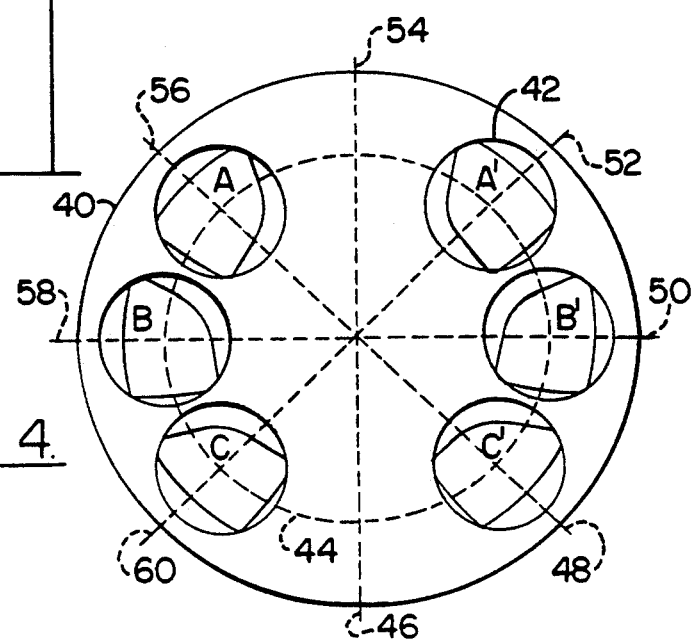
FIG. 4 is a plan view of the inner dome of the lens coating apparatus illustrating the alignment of the lens elements thereon.

After a thorough cleaning, at least one first lens element 12 is placed in a dome 32 as illustrated in FIGS. 3 and 4. Preferably, a pair of first lens elements 12 comprising both a left and a right first lens element are simultaneously processed. The dome 32 is preferably a vacuum coating machine having an outer dome 34, a bottom 36, a vaporization source 38 and an inner dome 40.

The inner dome 40 provides means to align left and right lens elements, three pairs of which are illustrated in FIG. 4, to match their axes of polarization. The three pairs illustrated in FIG. 4 are denoted A—A', B—B', and C—C'. This matching insures alignment of the polarization axes of the lenses in order to avoid the distortion and eyestrain caused by an imperfect alignment. Each first lens element 12 is placed in a recess 42 with each recess 42 arranged in a specific space relationship to one another. The first lens elements 12 may be retained in the recesses by any conventional means. The first lens elements 12 are positioned such that their inner surface 12a faces the bottom 36 of dome 32.

Each pair of first lens elements 12 is aligned by utilizing six reference lines in the dome 32. Referring to FIG. 4, line 44 represents the horizontal axis of each lens element held in a recess 42 and corresponds to the bigradient line 28 shown in FIG. 1. The line 44 is for reference purposes only and does not constitute a visible element or structural component of a lens element or the inner dome 28. Because the lens elements are not flat, the horizontal axes appears linear when viewed from above or below. Reference lines 46, 48, 50, 52, 54, 56, 58, and 60 are equidistantly spaced and are angularly separated from one another by 45 degrees. Lines 48, 50, 52, 56, 58 and 60 are intended to be perpendicular to line 44 representing the horizontal axis of each lens element. In this manner, the lens elements may be properly aligned and the placement of the bigradient coatings and the axis of polarization is automatically produced equally for right and left lens elements in the vacuum coating machine once the horizontal axis of each lens element is positioned perpendicular to the reference lines. The six lines are intended to be visible and are utilized to align the lens elements by crossing each line with the horizontal axis of the lens element. The lens elements are properly aligned when the reference line and the horizontal axis of the lens element are perpendicular.

After placement of the lens elements in the vacuum coating machine and aligning the lens elements, a bigradient coating material is vaporized with a vaporization source 38 to coat the inner surface 12a of the first lens elements 12. The bigradient coating material is placed within the dome 32 and the interior of the dome 12 is placed under vacuum conditions, preferably at pressures less than $6 \times 10^{-3}$ PA. The vaporization source is subsequently heated in order to vaporize the bigradient coating material.

The vaporized chemicals gather upward to the inner portion of the dome and will thereupon adhere to the inner surface 12a of the first lens elements 12. In order to produce the split mirror or double gradient effect, a protective shield 62 is placed in front of the lens element, between the vaporization source 38 and the first surface 12a of the lens element along the horizontal axis of the lens element. In FIG. 3, the shield 62 is shown to block the rising vaporized bigradient coating material in order to yield the bigradient coating and resulting clarity stripe 28 as illustrated in FIG. 1. Throughout the coating process, the pressure within the dome is preferably constantly monitored in order to avoid insufficient vacuum conditions.

The vaporization source 38 is preferably an electric heating element which uses an electric current to heat the bigradient coating materials. The preferred bigradient coating materials are metal oxide chrome and silicon dioxide which are vaporized for approximately thirty (30) minutes in the coating machine.

Following the deposition of the bigradient coating material, the first lens elements 12a are removed from the vacuum coating machine and are laminated to a corresponding second lens element 14 with a polarization film 18. Preferably, the laminated lens elements are subsequently cut to a desired shape and an anti-reflectant coating 20 is preferably vacuum processed to the outer surface 14b of the second precut lens element 14.

Following the laminating of the first and second lens elements and the application of an anti-reflectant coating, the resultant lens is dipped in a hydroponic solution, preferably comprised of silicon dioxide, in order to apply a waterproof coating 22. While the hydroponic coating 22 may be applied solely to the outer surface 14b of the second lens element 14 or the outer surface 12b of the first lens element 12, the laminated lens is preferably immersed completely in the waterproof solution in order to adhere a waterproof coating 22 to both the outer surface 12b of the first lens element 12 and the outer surface 14b of the second lens element 14.

By placing the bigradient coating between the lens elements, the mirrored effect of the resulting lens is reduced. Correspondingly, the percentage of impinging light reflected to the wearer's skin, and in particular the wearer's nose, is reduced. The internal bigradient film is also resistant to damage from scratching in contrast to prior external bigradient films and enables the use of a broader clarity stripe for increased visual acuity. As the bigradient film is applied prior to the introduction of a polarization film, the heat associated with the bigradient deposition need not be dissipated in order to protect the polarization film.

In the drawings and specification, there have been disclosed typical preferred embodiments of the invention and, although specific terms are employed, they are used in a generic and descriptive sense only and not for purposes of limitation. The scope of the invention being set forth in the following claims.

That which is claimed is:

1. A lens, comprising:
   a first lens element having inner and outer surfaces;
   a bigradient coating on said inner surface of said first lens element;
   a second lens element having inner and outer surfaces; and
   a polarization film disposed between said inner surface of said second lens element and said bigradient-coated inner surface of said first lens element such that said first and second lens elements are laminated together with said polarization film between said two lens elements.

2. The lens according to claim 1 wherein said bigradient coating is silicon dioxide.

3. The lens according to claim 1 wherein said bigradient coating is metal oxide chrome.

4. The lens according to claim 1 wherein said first and second lens elements are mineral glass.

5. The lens according to claim 1 further comprising an anti-reflectant coating on said outer surface of said second lens element.

6. The lens according to claim 1 further comprising a waterproof coating on said outer surface of said second lens element.

7. The lens according to claim 1 further comprising a waterproof coating on said outer surface of said first lens element.

8. The lens according to claim 1 further comprising waterproof coatings on both said outer surface of said first lens element and said outer surface of said second lens element.

9. The lens according to claim 8 wherein said waterproof coatings are silicon dioxide.

10. The lens according to claim 5 further comprising a waterproof coating on said anti-reflectant coated outer surface of said second lens element.

11. The lens according to claim 5 further comprising a waterproof coating on said outer surface of said first lens element.

12. The lens according to claim 5 further comprising waterproof coatings on both said outer surface of said first lens element and said anti-reflectant coated outer surface of said second lens element.

13. The lens according to claim 12 wherein said waterproof coatings are silicon dioxide.

14. A pair of glasses, comprising:
an eyeglass frame; and
first and second lenses disposed within said frame wherein each of said lenses are comprised of:
a first lens element having inner and outer surfaces;
a bigradient coating on said inner surface of said first lens element;
a second lens element having inner and outer surfaces; and
a polarization film disposed between said inner surface of said second lens element and said bigradient-coated inner surface of said first lens element such that said first and second lens elements are laminated together with said polarization film between said two glass lens elements.

15. The pair of glasses according to claim 14 wherein said bigradient coating adhered to said first lens is silicon dioxide.

16. The pair of glasses according to claim 14 wherein said bigradient coating adhered to said first lens is metal oxide chrome.

17. The pair of glasses according to claim 14 wherein said first and second lens elements are mineral glass.

18. The pair of glasses according to claim 14 wherein each of said first and second lenses further comprises an anti-reflectant coating on said outer surface of said second lens.

19. The pair of glasses according to claim 18 wherein each of said first and second lenses further comprises waterproof coatings on both said outer surface of said first lens element and said anti-reflectant coated outer surface of said second lens element.

20. The pair of glasses according to claim 19 wherein said waterproof coatings are silicon dioxide.

21. A method of manufacturing a lens, comprising the steps of:
providing a first and a second lens element wherein both said first and second lens elements have an inner and outer surface;
coating said inner surface of said first lens element with a bigradient coating;
disposing a polarization film between the bigradient-coated inner surface of said first lens element and said inner surface of said second lens element; and
laminating said first lens element to said second lens element with the polarization film disposed therebetween.

22. The method of manufacturing a lens according to claim 21 further comprising the step of coating said outer surface of said second lens element with an anti-reflectant coating.

23. The method of manufacturing a lens according to claim 22 further comprising the step of coating said anti-reflectant coated outer surface of said second lens element with a waterproof coating.

24. The method of manufacturing a lens according to claim 21 further comprising the step of coating said outer surface of said first lens element with a waterproof coating.

25. The method of manufacturing a lens according to claim 22 further comprising the step of coating both said outer surface of said first lens element and said anti-reflectant coated outer surface of said second lens element with waterproof coatings.

26. The method of manufacturing a lens according to claim 25 wherein said anti-reflectant coating step is preceded by the step of cutting the laminated first and second lens elements to a predetermined shape.

27. The method of manufacturing a lens according to claim 21 wherein said bigradient coating step is preceded by the step of cleaning said first and second lens elements.

28. A method of manufacturing a lens comprising the steps of:
providing a first and a second lens element wherein both said first and second lens elements have an inner and outer surface;
aligning the horizontal axis of said first lens element with an aligning means;
vaporizing a bigradient coating material with a vaporizing means disposed beneath said aligning means such that said inner surface of said first lens element faces said vaporizing means;
blocking vaporized material along said horizontal axis of said first lens element;
partially coating the inner surface of the first lens element such that the portion of the inner surface of the first lens element which is not blocked is coated with the vaporized bigradient coating material;
disposing a polarization film between the bigradient-coated inner surface of said first lens element and said inner surface of said second lens element; and
laminating said first lens element to said second lens element with the polarization film disposed therebetween.

29. The method of manufacturing a lens according to claim 28 wherein said aligning means comprises a dome having reference lines thereon wherein said horizontal axis of said first lens element is positioned orthagonal to a reference line.

30. The method of manufacturing a lens according to claim 28 wherein said bigradient materials are vaporized in a vacuum vaporization dome having a pressure of less than $6 \times 10^{-3}$ PA.

* * * * *